US010233849B2

(12) United States Patent
Keating

(10) Patent No.: US 10,233,849 B2
(45) Date of Patent: Mar. 19, 2019

(54) ENGINE WITH DEDICATED EGR EXHAUST PORT AND INDEPENDENTLY DEACTIVATABLE EXHAUST VALVES

(71) Applicant: GM GLOBAL TECHNOLOGY OPERATIONS LLC, Detroit, MI (US)

(72) Inventor: Edward J. Keating, Ortonville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 59 days.

(21) Appl. No.: 15/192,222

(22) Filed: Jun. 24, 2016

(65) Prior Publication Data

US 2016/0305350 A1 Oct. 20, 2016

Related U.S. Application Data

(63) Continuation of application No. 13/530,181, filed on Jun. 22, 2012, now Pat. No. 9,404,427.

(51) Int. Cl.
*F02D 13/02* (2006.01)
*F02M 26/41* (2016.01)

(52) U.S. Cl.
CPC ......... *F02D 13/0276* (2013.01); *F02M 26/41* (2016.02); *Y02T 10/18* (2013.01)

(58) Field of Classification Search
CPC ....... Y02T 10/18; Y02T 10/47; Y02T 10/121; F02D 13/0207; F02D 13/0257; F02D 2041/001; F02D 41/0007; F02D 13/0219; F02D 13/0249; F02D 13/0242; F02D 13/0246; F02D 13/0261; F02M 25/07; F02M 25/0707; F02M 25/077; F02M 25/0704
USPC ....... 123/568.12–568.32; 60/278, 602, 605.2
See application file for complete search history.

(56) References Cited

U.S. PATENT DOCUMENTS

| | | | | |
|---|---|---|---|---|
| 6,347,619 B1 * | 2/2002 | Whiting | .............. | F02D 13/0276 123/563 |
| 6,742,506 B1 * | 6/2004 | Grandin | .................. | F02B 37/00 123/568.12 |
| 8,100,117 B2 * | 1/2012 | Riegger | .............. | F01L 13/0005 123/315 |
| 2007/0240653 A1 * | 10/2007 | Petridis | ..................... | F01L 1/25 123/90.16 |
| 2010/0116255 A1 * | 5/2010 | Hatamura | ............... | F01L 1/181 123/564 |
| 2011/0162608 A1 * | 7/2011 | Riegger | .............. | F01L 13/0005 123/90.32 |
| 2012/0023933 A1 * | 2/2012 | Ulrey | .................. | F02D 13/0249 60/605.2 |
| 2012/0023935 A1 * | 2/2012 | Pursifull | ............. | F02D 13/0207 60/605.2 |
| 2012/0073288 A1 * | 3/2012 | Ulrey | .................. | F02D 13/0249 60/605.2 |

(Continued)

*Primary Examiner* — Sizo B Vilakazi
(74) *Attorney, Agent, or Firm* — Quinn IP Law

(57) ABSTRACT

An engine assembly includes an engine block defining a cylinder, an exhaust system, and an exhaust gas recirculation system. A first exhaust valve is configured to control fluid communication from the cylinder to the exhaust system. A second exhaust valve is configured to control fluid communication from the cylinder to the exhaust gas recirculation system. The second exhaust valve is selectively activatable and deactivatable independently of the first exhaust valve.

19 Claims, 3 Drawing Sheets

(56) References Cited

U.S. PATENT DOCUMENTS

2013/0174816 A1\* 7/2013 Riley ............... F02B 47/08
                                                   123/568.11
2014/0283799 A1\* 9/2014 Ulrey ............... F02D 13/0249
                                                   123/568.12

\* cited by examiner

ENGINE WITH DEDICATED EGR EXHAUST PORT AND INDEPENDENTLY DEACTIVATABLE EXHAUST VALVES

CROSS-REFERENCE TO RELATED APPLICATIONS

This application is a continuation of U.S. patent application Ser. No. 13/530,181, filed on Jun. 22, 2012, which is hereby incorporated by reference in its entirety.

TECHNICAL FIELD

This invention relates to engine assemblies having exhaust gas recirculation.

BACKGROUND

Certain vehicles include an exhaust gas recirculation (EGR) system to selectively direct internal combustion engine exhaust gas to an air inlet of the engine. EGR can lower the level of certain undesirable engine emission components such as nitrogen oxide (NOx) and can improve fuel economy. EGR typically involves recirculation of exhaust gas through an EGR passage between an engine exhaust system and an engine fresh air intake passage. A valve within the EGR passage (the EGR valve) is controlled to vary a restriction within the EGR passage to regulate the flow of exhaust gas therethrough.

SUMMARY

An engine assembly includes an engine block defining a cylinder, an exhaust system, and an exhaust gas recirculation system. A first exhaust valve is configured to control fluid communication from the cylinder to the exhaust system. A second exhaust valve is configured to control fluid communication from the cylinder to the exhaust gas recirculation system. The second exhaust valve is selectively activatable and deactivatable independently of the first exhaust valve.

Accordingly, the amount of recirculated exhaust gas can be controlled by controlling whether the second exhaust valve is activated or deactivated, which enables the elimination of an EGR valve between the exhaust gas recirculation system and an air intake system. The elimination of the EGR valve may improve EGR system reliability. The use of the second exhaust valve to control EGR flow may also facilitate reducing the volume of the EGR system compared to the prior art, and may improve EGR response time compared to the prior art.

In one embodiment, the first exhaust valve is selectively activatable and deactivatable independently of the second exhaust valve, which allows a mode of engine operation in which exhaust flows from the cylinder to the EGR system, but not to the exhaust system, i.e., all of the exhaust gas produced in the cylinder is recirculated through the air intake system; accordingly, during this mode of engine operation, fuel economy improvement is possible due to the ability to run an enriched mixture in selected cylinders without negatively impacting emission control devices leading to increased EGR tolerance.

The above features and advantages and other features and advantages of the present invention are readily apparent from the following detailed description of the best modes for carrying out the invention when taken in connection with the accompanying drawings.

DETAILED DESCRIPTION

Figure 1:
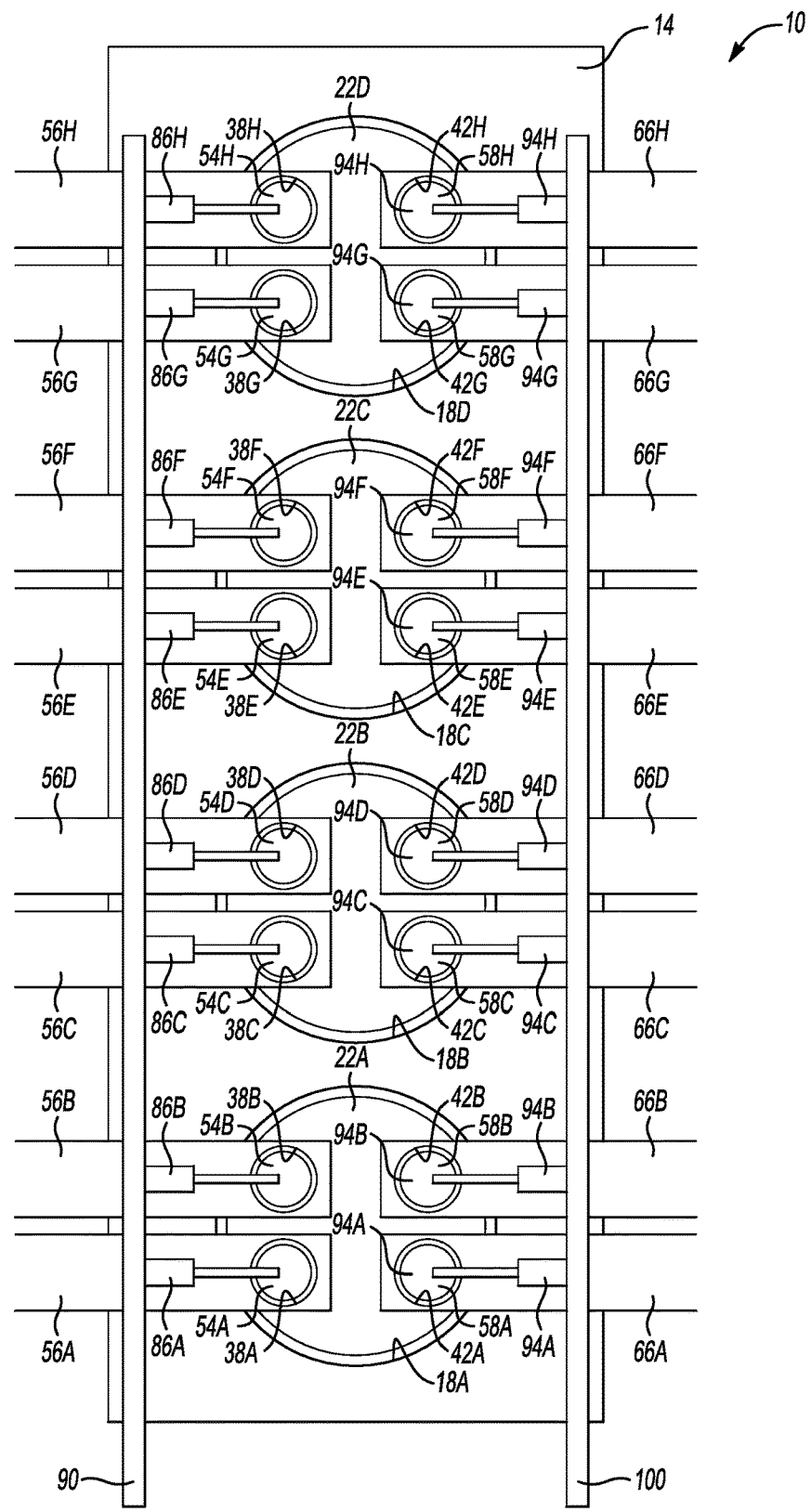
FIG. 1 is a schematic, top view of a portion of an engine assembly.

Referring to the drawings wherein like characters represent the same or corresponding parts throughout the several views, there is seen in FIG. 1 an internal combustion engine 10. The engine 10 includes an engine block 14 defining a plurality of cylinders 18A-D. The engine 10 further includes a plurality of pistons 22A-D. Each piston 22A-D is positioned within a respective one of the cylinders 18A-D for reciprocal translation therein between a top dead center position and a bottom dead center position, as understood by those skilled in the art.

Figure 2:
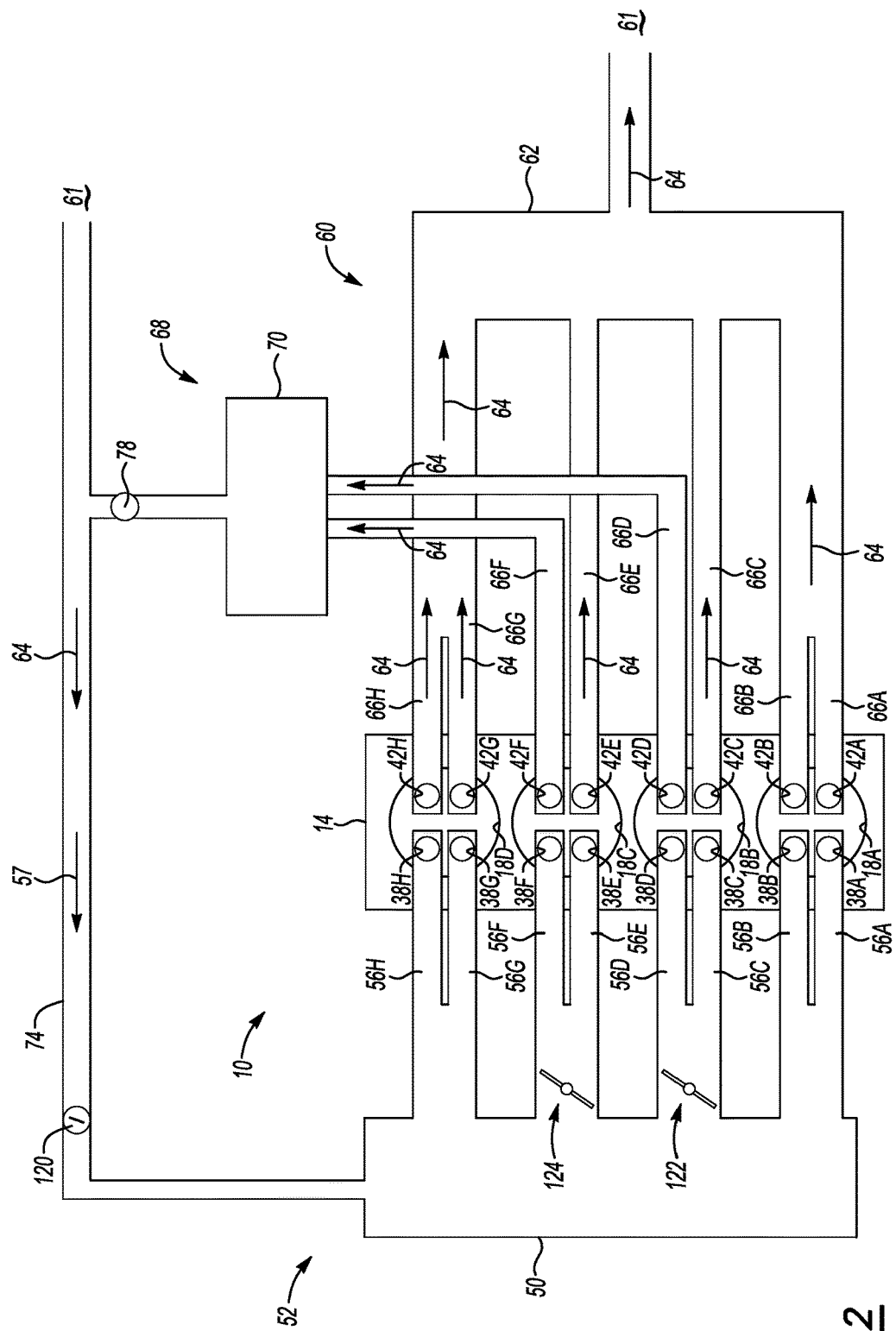
FIG. 2 is a schematic, top view of the engine assembly of FIG. 1 including an air intake system, an exhaust system, and an EGR system applied to two cylinders.

Each piston 22A-D is operatively connected to a crankshaft (shown at 26 in FIG. 3) via a respective connecting rod (shown at 30 in FIG. 3) such that the reciprocal translation of each piston causes rotation of the crankshaft 26 and vice versa. Each cylinder 18A-D includes one or more (two shown in the embodiment depicted) respective intake ports 38A-H, and two respective exhaust ports 42A-H formed by a cylinder head (shown at 46 in FIG. 3). Referring to FIGS. 1 and 2, each intake port 38A-H is in selective fluid communication with an intake manifold 50 of an air intake system 52 via a respective runner 56A-H to receive an intake charge including air and recirculated exhaust gas.

Each cylinder 18A-D has one or more (two shown in the embodiment depicted) respective intake valves 54A-H associated therewith. Each intake valve 54A-H is movable between an open position in which the cylinder associated with the intake valve is in fluid communication with the intake manifold 50 via its respective intake port 38A-H and runner 56A-H, and a closed position in which the intake valve 54A-H obstructs a respective one of the intake ports 38A-H thereby to prevent fluid communication between the cylinder 18A-D associated with the intake valve and the air intake system 52. Thus, air flow 57 from the intake manifold 50 into each of the cylinders 18A-D is controlled by one or more intake valves 54A-H.

Exhaust ports 42A, 42B, 42C, 42E, 42G, 42H are in selective communication with the exhaust system 60. Thus, in the embodiment depicted, each cylinder 18A-D has at least one exhaust port that is in selective fluid communication with an exhaust system 60 configured to convey a portion of the exhaust gases 64 produced in the cylinders 18A-D to the atmosphere 61. More specifically, the exhaust system 60 includes an exhaust manifold 62. Each of exhaust ports 42A, 42B, 42C, 42E, 42G, 42H is in selective fluid communication with the exhaust manifold 62 via a respective runner 66A, 66B, 66C, 66E, 66G, 66H. Fluid entering the exhaust manifold 62 is directed to the atmosphere 61. The exhaust system 60 may include other components (not shown), such as exhaust treatment systems (e.g., catalysts) to change the chemical composition of the exhaust gas 64 before it exits the exhaust system 60. If the engine 10 is turbocharged, then the exhaust system may also include a turbine (not shown).

In the embodiment depicted, two cylinders 18B, 18C include a respective exhaust port 42D, 42F that is in selective fluid communication with an exhaust gas recirculation (EGR) system 68. The EGR system 68 includes an EGR collector 70 that is in fluid communication with each of exhaust ports 42D, 42F via a respective runner 66D, 66F. The collector 70 is in selective fluid communication with the air intake system 52. More specifically, the air intake system 52 includes an intake duct 74 that provides fluid communication between the atmosphere 61 and the air intake manifold 50. The EGR collector 70 is in selective fluid communication with the duct 74 such that exhaust gas 64 in the collector 70 can enter the duct 74 and thereafter be transmitted to the intake manifold 50 for induction into the cylinders 18A-D.

In the embodiment depicted, the EGR system 68 includes a one-way valve 78 that permits fluid flow from the collector 70 to the duct 74, but prevents fluid flow from the duct 74 to the collector 70.

Each cylinder 18A-D has two respective exhaust valves 58A-H associated therewith. Each of exhaust valves 58A, 58B, 58C, 58E, 58G, 58H is movable between an open position in which the cylinder associated with the exhaust valve is in fluid communication with the exhaust manifold 62 via its respective exhaust port 42A, 42B, 42C, 42E, 42G, 42H and a closed position in which the exhaust valve 58A, 58B, 58C, 58E, 58G, 58H obstructs its respective exhaust ports 42A, 42B, 42C, 42E, 42G, 42H thereby to prevent fluid communication between the cylinder 18A-D associated with the exhaust valve and the exhaust manifold 62.

Each of exhaust valves 58D, 58F is movable between an open position in which the cylinder associated with the exhaust valve is in fluid communication with the EGR collector 70 via its respective exhaust port 42D, 42F and a closed position in which the exhaust valve 58D, 58F obstructs its respective exhaust ports 42D, 42F thereby to prevent fluid communication between the cylinder 18A-D associated with the exhaust valve and the EGR collector 70.

It should be noted that the EGR system 68 and the exhaust system 60 in the embodiment depicted are separate and distinct systems, and are not coextensive. There is no direct fluid communication between the EGR system 68 and the exhaust system 60. There is no EGR passageway that allows fluid communication (exhaust flow) from the exhaust system 60 to the air intake system 52. Thus, exhaust gas 64 that enters the exhaust system 60 via ports 42A, 42B, 42C, 42E, 42G, 42H cannot enter the EGR system 68 or the air intake system 52 except through one of the cylinders 18A-D or after being released to the atmosphere 61. Similarly, exhaust gas 64 that enters the EGR system 68 via ports 42D, 42F cannot enter the exhaust system 60 without first travelling through the air intake system 52 and/or through one of the cylinders 18A-D. Accordingly, ports 42D, 42F are dedicated EGR exhaust ports: exhaust flow through ports 42D, 42F is used for EGR and is not directed to the atmosphere 61 without first being recirculated through the engine cylinders 18A-D.

The intake valves 54A-H are spring-biased in the closed position. The engine 10 includes intake valve actuators 86A-H, each of the intake valve actuators being configured to selectively cause a respective one of the intake valves 54A-H to move between its open and closed positions. In the embodiment depicted, the actuators 86A-H operatively engage an intake camshaft 90. The exhaust valves 58A-H are also spring-biased in the closed position. The engine 10 includes exhaust valve actuators 94A-H, each being configured to selectively cause a respective one of the exhaust valves 58A-H to move between its open and closed positions. Actuators 94A-H operatively engage an exhaust camshaft 100. Those skilled in the art will recognize a variety of valve actuators that may be employed within the scope of the claimed invention, such as cam-operated rocker arms, cam-operated finger followers, solenoids, etc.

Figure 3:
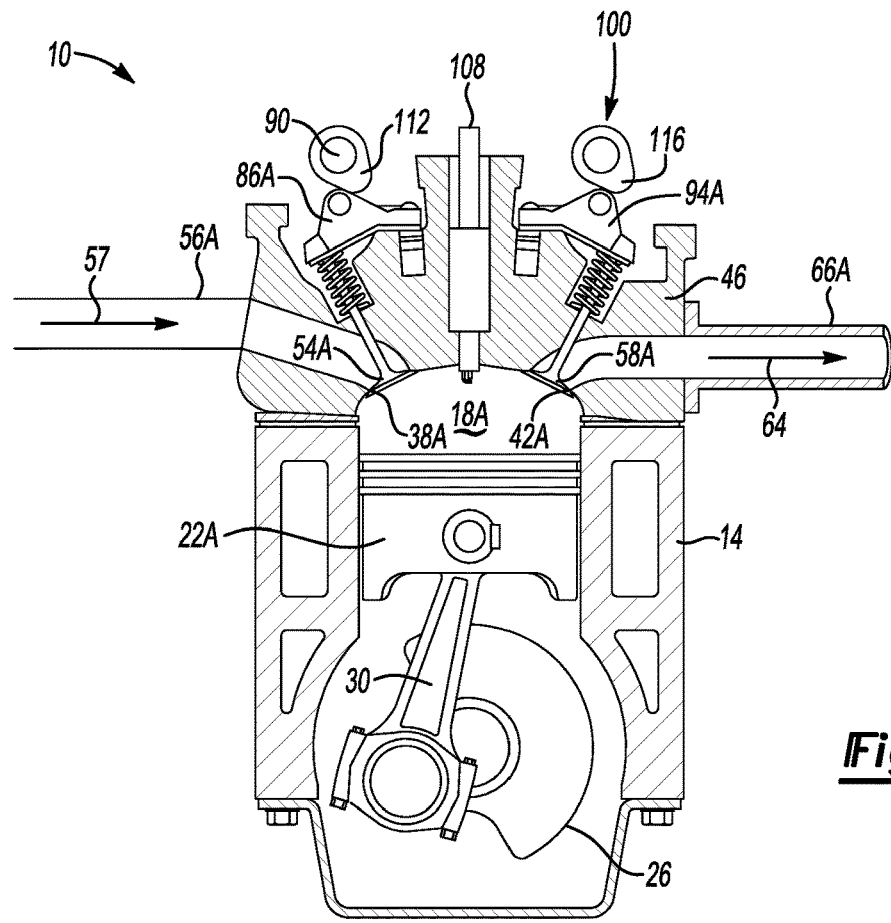
FIG. 3 is a schematic, sectional side view of the engine assembly of FIG. 1.

FIG. 3 schematically depicts cylinder 18A, valves 54A, 58A, and actuators 86A, 94A. It should be noted that cylinder 18A is representative of the other cylinders 18B-D. Referring to FIG. 3, the engine 10 in the embodiment depicted also includes a plurality of spark plugs 108, each configured to provide a spark in a respective one of the cylinders 18A-D. However, compression ignition engines may also be employed within the scope of the claimed invention. Camshaft 90 includes a plurality of intake cams 112 operatively connected thereto for rotation therewith. Each intake cam 112 is engaged with a respective one of the intake valve actuators 86A-H, as understood by those skilled in the art. Camshaft 90 is operatively connected to the crankshaft 26, such as via gears, chain drive, or belt drive, such that the camshaft 90 rotates once for every two rotations of the crankshaft 26. The lobe of cam 112 causes the intake valve 54A to open and close as the camshaft 90 rotates, as understood by those skilled in the art. Similarly, camshaft 100 is operatively connected to the crankshaft 26, such as via gears, chain drive, or belt drive, such that the camshaft 100 rotates once for every two rotations of the crankshaft 26. The lobe of cam 116 causes the exhaust valve 58A to open and close as the camshaft 100 rotates, as understood by those skilled in the art.

In the embodiment depicted, valve actuators 94C, 94D, 94E, 94F are controllable to selectively activate and deactivate valves 58C, 58D, 58E, 58F respectively. Exhaust valves 58C, 58D, 58E, 58F open and close once during every two rotations of the crankshaft 26 when activated. When the exhaust valves 58C, 58D, 58E, 58F are deactivated, they remain closed irrespective of crankshaft rotation. Those skilled in the art will recognize various valve actuator configurations that enable selective valve deactivation. In one embodiment, all of exhaust valves 58C-F are selectively deactivatable.

More specifically, exhaust valves 58C, 58D, 58E, 58F are activatable and deactivatable independently from one another, and independently of the other exhaust valves 58A, 58B, 58G, 58H. Thus, for example, valve 58D may be deactivated, i.e., remain closed regardless of the rotational position of the crankshaft, while simultaneously valves 58C, 58E, 58F are activated and open and close once during every two rotations of the crankshaft 26. Valves 58A, 58B, 58G, 58H may or may not be selectively deactivatable within the scope of the claimed invention.

Thus, the engine 10 includes an engine block 14 defining a first cylinder 18B having a first exhaust port 42C and a second exhaust port 42D. The block 14 also defines a second cylinder 18A having a third exhaust port 42B. An exhaust system 60 is in fluid communication with the first exhaust port 42C and the third exhaust port 42B. An exhaust gas recirculation system 68 provides fluid communication from the second exhaust port 42D to the air intake system 52, and is not in direct fluid communication with either the first exhaust port 42C or the third exhaust port 42B.

A first exhaust valve 58C is configured to control the flow of fluid through the first exhaust port 42C and thus controls the flow of fluid (i.e., exhaust 64) from the cylinder 18B to the exhaust system 60. A second exhaust valve 58D is configured to control the flow of fluid (i.e., exhaust 64) through the second exhaust port 42D, and thus controls the flow of fluid from the cylinder 18B to the EGR system 68. A third exhaust valve 58B is configured to control the flow of fluid though the third exhaust port 42B and thus controls the flow of fluid (i.e., exhaust 64) from the cylinder 18A to the exhaust system 60. The second exhaust valve 58D is selectively activatable and deactivatable independently of the first exhaust valve 58C and the third exhaust valve 58B. The first exhaust valve 58C is selectively activatable and deactivatable independently of the second exhaust valve 58D.

Thus, the engine 10 is characterized by a first mode of operation in which the first exhaust valve 58C is activated and the second exhaust valve 58D is deactivated. In the first mode of operation, when the second exhaust valve 58D is deactivated (while the first and third exhaust valves 58C, 58B are activated), there is no exhaust flow to the EGR system 68 from the cylinder 18B. Thus, exhaust flow to the EGR system 68 can be specified by controlling whether the second exhaust valve 58D is activated or deactivated. Similarly, activating exhaust valve 58F permits exhaust flow from cylinder 18C to the EGR system 68, whereas deactivating exhaust valve 58F while exhaust valve 58E is active prevents exhaust flow from cylinder 18C to the EGR system 68.

The engine 10 is also characterized by a second mode of operation in which the first exhaust valve 58C is deactivated and the second exhaust valve 58D is activated. In the second mode, when the first exhaust valve 58C is deactivated and the second exhaust valve is activated, the first valve remains closed regardless of crankshaft position, whereas the second exhaust valve 58D opens during the exhaust stroke of the piston 22B, and thus all of the exhaust from the cylinder 18B goes to the EGR system 68. It should be noted that, in the embodiment depicted, the first exhaust valve 58C is selectively activatable and deactivatable independently of the third exhaust valve 58B (if exhaust valve 58B is selectively deactivatable). Thus, exhaust gas from cylinder 18A still enters the exhaust system 60 during the second mode of engine operation because the third exhaust valve 58B is activated.

The engine 10 is also characterized by a third mode of operation in which both the first and second exhaust valves 58C, 58D are activated so that exhaust gas from cylinder 18B is distributed between the EGR system 68 and the exhaust system 60. The proportion of exhaust gas going to the EGR system 68 relative to the exhaust system 60 may depend on whether valve 58D has different lift from valve 58C, different timing from valve 58C, etc.

Other engine operating modes are possible based on the different combinations of exhaust valve activation and deactivation. Thus, for example, in one mode of operation, valves 58C and 58E are activated and valves 58D and 58F are deactivated such that no exhaust is directed to the EGR system 68. In another mode of operation, valves 58C and 58E are deactivated and valves 58D and 58F are activated such that all the exhaust from cylinders 18B and 18C go to the EGR system 68. In yet another mode of operation, valve 58D is deactivated and valves 58C, 58E, and 58F are activated.

Referring again to FIG. 2, the engine 10 includes a throttle valve 120 upstream of the intake manifold 50 to control the amount of air 57 drawn into the manifold for distribution to the cylinders 18A-D via the runners 56A-H. In order to further control the amount of exhaust gas that enters the EGR system 68, the engine 10 in the embodiment depicted includes individual throttles for cylinders 18B, 18C (i.e., the cylinders having dedicated EGR exhaust valves 42D, 42F). More specifically, the engine assembly further includes the first throttle valve 120 upstream of the intake manifold 50, a second throttle valve 122 downstream of the intake manifold 50 and upstream of intake ports 38C, 38D. Thus, the second throttle valve 122 controls the flow of air 57 (and fuel, EGR 64, etc.) from the intake manifold 50 to cylinder 18B. The engine assembly also includes a third throttle valve 124 downstream of the intake manifold 50 and upstream of intake ports 38E, 38F. Thus, the third throttle valve 124 controls the flow of air 57 (and fuel, EGR 64, etc.) from the intake manifold 50 to cylinder 18C. It should be noted that an engine may or may not include throttle valves 122 and 124 downstream of the intake manifold within the scope of the claimed invention.

Figure 4:
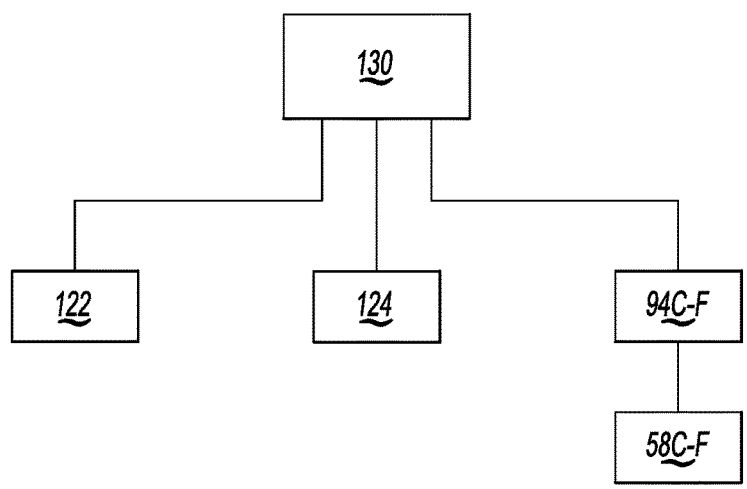
FIG. 4 is schematic view of a controller operatively connected to the valve actuators and throttle valves shown in the engine of FIGS. 1 and 2.

Referring to FIG. 4, the engine 10 includes an engine controller 130, also referred to as an engine control module, which is operatively connected to the throttle valves 122, 124 to adjust their positions in order to control the amount of EGR produced and directed to the EGR system 68. The controller 130 is also connected to the valves 58C-F via the actuators 94C-F to selectively cause the first mode of engine operation, the second mode of engine operation, and the third mode of engine operation.

While the best modes for carrying out the invention have been described in detail, those familiar with the art to which this invention relates will recognize various alternative designs and embodiments for practicing the invention within the scope of the appended claims.

The invention claimed is:

1. An engine assembly comprising:
   an engine block defining a cylinder having a first exhaust port and a second exhaust port;
   an exhaust system;
   an exhaust gas recirculation system;
   a first exhaust valve disposed upstream from the exhaust system and movable relative to the first exhaust port to selectively obstruct the first exhaust port of the cylinder such that the first exhaust valve is configured to control fluid communication through the first exhaust port to the exhaust system;
   a second exhaust valve configured to control fluid communication through the second exhaust port to the exhaust gas recirculation system;
   wherein the first exhaust valve is selectively activatable and deactivatable independently of the second exhaust valve; and
   wherein the second exhaust valve is selectively activatable and deactivatable independently of the first exhaust valve.

2. The engine assembly of claim 1, further comprising a crankshaft being rotatable, and wherein the second exhaust valve remains closed when deactivated regardless of a rotational position of the crankshaft.

3. The engine assembly of claim 1, further comprising a crankshaft being rotatable, and wherein the first exhaust valve remains closed when deactivated regardless of a rotational position of the crankshaft.

4. The engine assembly of claim 1, further comprising a controller operatively connected to the first and second exhaust valves to control whether the first and second exhaust valves are activated or deactivated; and wherein the controller is configured to selectively cause the engine to operate in a first mode of operation in which the first exhaust valve is activated and the second exhaust valve is deactivated.

5. The engine assembly of claim 4, wherein the controller is configured to selectively cause the engine to operate in a second mode of operation in which the first exhaust valve is deactivated and the second exhaust valve is activated.

6. The engine assembly of claim 5, wherein the controller is configured to selectively cause the engine to operate in a third mode of operation in which the first exhaust valve and the second exhaust valve are activated.

7. The engine assembly as set forth in claim 1, wherein the cylinder is defined as a first cylinder, and wherein the engine block defines a second cylinder having a third exhaust port, and wherein the exhaust system is in fluid communication with the third exhaust port.

8. The engine assembly as set forth in claim 7, wherein the exhaust gas recirculation system is not in direct fluid communication with either the first exhaust port or the third exhaust port.

9. The engine assembly as set forth in claim 7, further comprising a third exhaust valve configured to control fluid communication though the third exhaust port, and wherein the second exhaust valve is selectively activatable and deactivatable independently of the first exhaust valve and the third exhaust valve.

10. The engine assembly of claim 9, wherein the first exhaust valve is selectively activatable and deactivatable independently of the third exhaust valve.

11. The engine assembly of claim 9, further comprising a controller operatively connected to the first and second exhaust valves to control whether the first and second exhaust valves are activated or deactivated.

12. The engine assembly of claim 11, wherein the controller is configured to selectively cause the engine to operate in a first mode of operation in which the first exhaust valve is activated and the second exhaust valve is deactivated.

13. The engine assembly of claim 12, wherein the controller is configured to selectively cause the engine to operate in a second mode of operation in which the first exhaust valve is deactivated and the second exhaust valve is activated.

14. The engine assembly of claim 13, wherein the controller is configured to selectively cause the engine to operate in a third mode of operation in which the first exhaust valve and the second exhaust valve are activated; and wherein the third exhaust valve is activated in the first and second modes of operation.

15. An engine assembly comprising:
an engine block defining a cylinder having a first exhaust port and a second exhaust port;
an exhaust system;
an exhaust gas recirculation system;
a first exhaust valve configured to control fluid communication through the first exhaust port directly to the exhaust system independently of the exhaust gas recirculation system;
a second exhaust valve configured to control fluid communication through the second exhaust port directly to the exhaust gas recirculation system to bypass the exhaust system;
wherein the first exhaust valve is selectively activatable and deactivatable independently of the second exhaust valve; and
wherein the second exhaust valve is selectively activatable and deactivatable independently of the first exhaust valve.

16. The engine assembly of claim 15, further comprising a crankshaft being rotatable, and wherein the second exhaust valve remains closed when deactivated regardless of a rotational position of the crankshaft.

17. The engine assembly as set forth in claim 15, wherein the cylinder is defined as a first cylinder, and wherein the engine block defines a second cylinder having a third exhaust port, and wherein the exhaust system is in fluid communication with the third exhaust port, and further comprising a third exhaust valve configured to control fluid communication though the third exhaust port directly to the exhaust system independently of the exhaust gas recirculation system.

18. The engine assembly as set forth in claim 17, wherein the second exhaust valve is selectively activatable and deactivatable independently of the first exhaust valve and the third exhaust valve.

19. An engine assembly comprising:
an engine block defining a first cylinder having a first exhaust port and a second exhaust port, and a second cylinder having a third exhaust port and a fourth exhaust port;
an exhaust system;
a plurality of runners directing fluid communication from the respective first exhaust port of the first cylinder and the respective third and fourth exhaust ports of the second cylinder to the exhaust system;
an exhaust gas recirculation system;
a runner directing fluid communication from the second exhaust port of the first cylinder to the exhaust gas recirculation system;
a first exhaust valve disposed upstream from the exhaust system and movable relative to the first exhaust port to selectively obstruct the first exhaust port of the first cylinder such that the first exhaust valve is configured to control fluid communication through the first exhaust port to the exhaust system;
a second exhaust valve configured to control fluid communication through the second exhaust port of the first cylinder to the exhaust gas recirculation system; and
wherein the first exhaust valve is selectively activatable and deactivatable independently of the second exhaust valve;
wherein the second exhaust valve is selectively activatable and deactivatable independently of the first exhaust valve.

* * * * *